United States Patent
Lin et al.

(10) Patent No.: US 10,498,563 B2
(45) Date of Patent: Dec. 3, 2019

(54) PROCESSING A CONSTANT AMPLITUDE SEQUENCE FOR TRANSMISSION

(71) Applicant: Telefonaktiebolaget LM Ericsson (publ), Stockholm (SE)

(72) Inventors: Xingqin Lin, San Jose, CA (US); Ansuman Adhikary, Hyderabad (IN); Asbjörn Grövlen, Stockholm (SE); Niklas Johansson, Uppsala (SE); Yutao Sui, Solna (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/773,254

(22) PCT Filed: Nov. 4, 2016

(86) PCT No.: PCT/SE2016/051090
§ 371 (c)(1),
(2) Date: May 3, 2018

(87) PCT Pub. No.: WO2017/078607
PCT Pub. Date: May 11, 2017

(65) Prior Publication Data
US 2018/0331775 A1 Nov. 15, 2018

Related U.S. Application Data

(60) Provisional application No. 62/252,187, filed on Nov. 6, 2015.

(51) Int. Cl.
*H04J 13/00* (2011.01)
*H04L 25/03* (2006.01)
(Continued)

(52) U.S. Cl.
CPC .... *H04L 25/03834* (2013.01); *H04J 13/0062* (2013.01); *H04J 13/105* (2013.01);
(Continued)

(58) Field of Classification Search
CPC ...... H04J 13/0062; H04J 13/105; H04J 13/00; H04J 13/10; H04L 25/03834;
(Continued)

(56) References Cited

U.S. PATENT DOCUMENTS 7,340,006 B2 * 3/2008 Yun ..................... H04L 27/2618
375/260
7,496,028 B2 * 2/2009 Jung ................... H04L 27/2618
370/208

(Continued)

FOREIGN PATENT DOCUMENTS

EP 1991016 A1 11/2008

OTHER PUBLICATIONS

3GPP TSG RAN WG1 #46bis, R1-062630, Texas Instruments, Non synchronized Random Access structure for E-UTRA, 6.4.3, Seoul, South Korea, Oct. 9-13, 2006.

(Continued)

*Primary Examiner* — Man U Phan
(74) *Attorney, Agent, or Firm* — Sage Patent Group

(57) ABSTRACT

An apparatus and method for processing a constant amplitude sequence yields a transmission signal exhibiting a low PAPR. The method comprises extending a constant amplitude sequence, such as a Zadoff-Chu sequence, by adding to the sequence one or more complex-valued elements that have the same amplitude as other complex-valued elements in the sequence. The method also includes upsampling the extended sequence by linearly interpolating a difference in phase between adjacent complex-valued elements in the extended sequence. The method further entails limiting a
(Continued)

bandwidth of the upsampled sequence by low pass filtering the upsampled sequence. The method may also include transmitting the band limited sequence. Due to the low PAPR of the transmitted signal, a power amplifier, which may be integrated with other circuits in a System-on-Chip, may have a low backoff. This yields high efficiency for the amplifier, hence low power consumption, and extended battery life in radio network devices.

19 Claims, 10 Drawing Sheets

(51) Int. Cl.
*H04L 27/26* (2006.01)
*H04J 13/10* (2011.01)
(52) U.S. Cl.
CPC ...... *H04L 27/2613* (2013.01); *H04L 27/2614* (2013.01); *H04L 27/2692* (2013.01)
(58) Field of Classification Search
CPC ............ H04L 27/2613; H04L 27/2614; H04L 27/2692; H04L 25/03; H04L 27/26; H04W 52/52
USPC ................................................ 370/329, 352
See application file for complete search history.

(56) References Cited

U.S. PATENT DOCUMENTS

| | | | | |
|---|---|---|---|---|
| 7,715,492 B2* | 5/2010 | Seki | ............ | H04L 5/0046 375/295 |
| 8,130,863 B2* | 3/2012 | Han | ............ | H04L 5/0007 375/260 |
| 8,144,746 B2* | 3/2012 | Iwai | ............ | H04J 13/0062 375/146 |
| 8,199,778 B2* | 6/2012 | Shimomura | ....... | H04W 74/004 370/328 |
| 8,295,389 B2* | 10/2012 | Han | ............ | H04L 5/0007 375/260 |
| 8,331,420 B2* | 12/2012 | Kleider | ............ | H04L 5/0023 370/500 |
| 8,520,768 B2* | 8/2013 | Han | ............ | H04L 5/0007 370/329 |
| 8,532,047 B2* | 9/2013 | Nguyen | ............ | H04J 11/003 370/329 |
| 8,625,715 B2* | 1/2014 | Rajagopal | ............ | H04L 25/0226 375/260 |
| 8,948,294 B2* | 2/2015 | Han | ............ | H04L 5/0007 375/295 |
| 8,964,717 B2* | 2/2015 | Inoue | ............ | H04J 13/0077 370/343 |
| 8,989,327 B2* | 3/2015 | Han | ............ | H04L 5/0007 375/354 |
| 9,042,246 B2* | 5/2015 | Paine | ............ | H04L 41/5035 370/252 |
| 9,313,062 B2* | 4/2016 | Muharemovic | ....... | H04L 1/1854 |
| 9,385,908 B2* | 7/2016 | Nishikawa | ............ | H04L 27/262 |
| 9,392,492 B2* | 7/2016 | Inoue | ............ | H04J 13/0077 |
| 9,584,244 B2* | 2/2017 | Han | ............ | H04L 5/0007 |
| 9,735,938 B2* | 8/2017 | Inoue | ............ | H04J 13/0077 |
| 9,787,421 B2* | 10/2017 | Oketani | ............ | H04J 13/0059 |
| 10,057,003 B2* | 8/2018 | Han | ............ | H04L 5/0007 |
| 10,341,037 B2* | 7/2019 | Han | ............ | H04L 5/0007 |

OTHER PUBLICATIONS

3GPP TSG RAN WG1 Meeting #74bis, R1-134130, Intel Corporation, PRACH coverage enhancement for low cost MTC, 7.2.2.2.2, Guangzhou, China, Oct. 7-11, 2013.
3GPP TSG RAN Meeting #69, RP-151621, Qualcomm Incorporated, New Work Item: NarrowBand IOT (NB-IOT), 14, Phoenix, Arizona, USA, Sep. 14-16, 2015.
3GPP TSG RAN WG1 Meeting #82bis, R1-155610, 7.2.1.1, Soney, Considerations on frequency hopping, Malmo, Sweden, Oct. 5-9, 2015.
3GPP TSG RAN WG1 Meeting #82bis, R1-155973, Neul, Huawei, HiSilicon, On the RACH design for SC-FDMA uplink, 7.2.6.2.2, Malmo, Sweden, Oct. 5-9, 2015.
3GPP TSG-RAN WG1 #82bis, R1-156010, Ericsson, Alcatel-Lucent, Alcatel-Lucent Shanghai Bell, Nokia, Intel, ZTE, Samsung, NB-LTE—General L1 Concept Description, 7.2.6.2.2, Malmo, Sweden, Oct. 5-9, 2015.
3GPP TSG-RAN1 #82bis, R1-156011, Ericsson, Narrowbankd LTE—Random Access Design, 7.2.6.2.2, Malmo, Sweden, Oct. 5-9, 2015.
3GPP TSG-RAN WG1 #87, R1-1612920, Ericsson, On Multiplexing of short UCI and data, 7.1.4.2, Reno, Nevada, USA, Nov. 14-18, 2016.
Lotter et al., "Constant envelope filtering of complex spreading sequences," Electronics Letters v. 31, No. 17, Aug. 17, 1995, pp. 1406-1407.
Dahlman et al. "3G Evolution HSPA and LTE for Mobile Broadband," Academic Press, Great Britain, 2007, p. 346.

\* cited by examiner

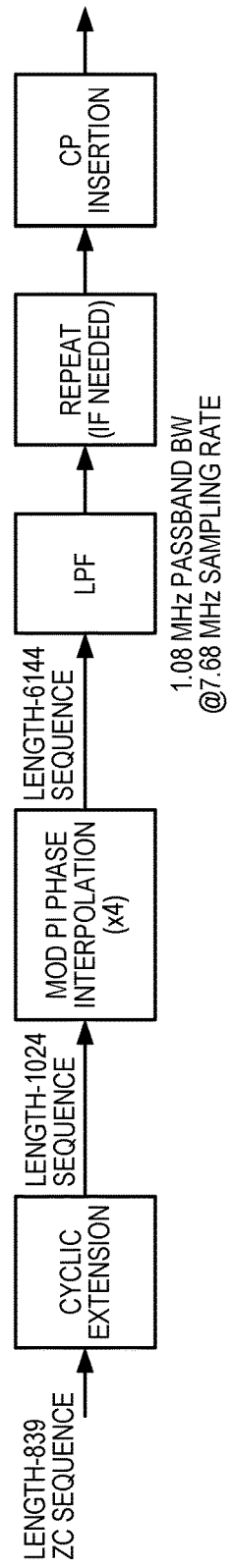
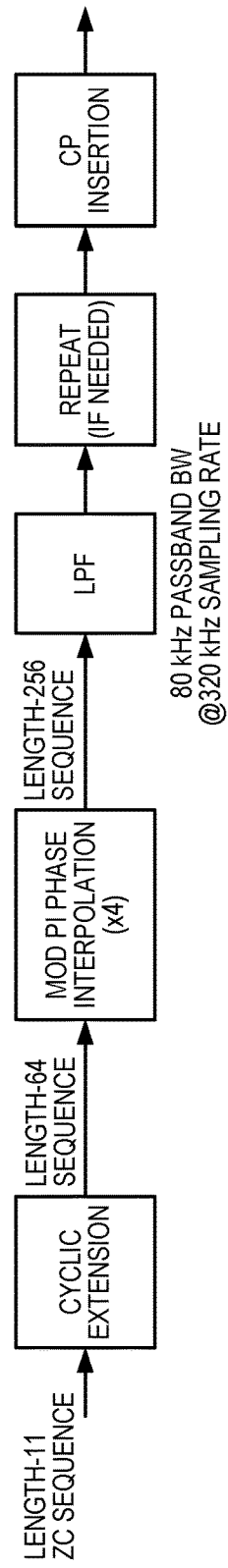
FIG. 9
FIG. 10

PROCESSING A CONSTANT AMPLITUDE SEQUENCE FOR TRANSMISSION

RELATED APPLICATIONS

This application is a national phase entry filing of international application PCT/SE2016/015090 (published as WO 2017/078607), which claims priority to U.S. Provisional patent Application Ser. No. 62/252,187 filed 6 Nov. 2015, the entire contents of which are incorporated herein by reference.

TECHNICAL FIELD

The present invention relates generally to wireless communication networks, and in particular to a system and method of selecting and processing a constant amplitude sequence for transmission that exhibits a low PAPR.

BACKGROUND

Wireless communication networks, including network nodes and radio network device nodes such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

Another development of modern wireless communication networks is support for expanded machine-to-machine (M2M) or machine type communications (MTC), variously known as the Networked Society or Internet of Things (IoT). This support is associated with new requirements on the networks, e.g., with respect to device cost, battery lifetime and coverage. To drive down device and module cost, using a system-on-a-chip (SoC) solution with integrated power amplifier (PA) is highly desirable. However, it is only feasible for the current state-of-the-art PA technology to allow ~20-23 dBm transmit power when the PA is integrated to SoC. This constraint limits uplink "coverage," which is related to the tolerable path loss between the radio network device and serving network node, such as a base station. To maximize the coverage achievable by an integrated PA, it is necessary to reduce PA backoff. PA backoff is needed when the communication signal has non-unity peak-to-average power ratio (PAPR). The higher the PAPR, the higher the PA backoff is needed. Higher PA backoff also gives rise to lower PA efficiency, and thus lower device battery life time. Thus, for wireless IoT technologies, designing an uplink communication signal that has as low PAPR as possible is critically important for achieving the performance objectives concerning device cost, battery lifetime, and coverage. Even for mobile broadband applications, it is desirable to have a technology that help the devices generate radio signals that have low PAPR.

Currently 3GPP is standardizing Narrow-band IoT (NB IoT) technologies. There is strong support from the existing LTE eco-system (vendors and operators) for evolving existing LTE specifications to include the desired NB IoT features. This is motivated by the time-to-market consideration, as an LTE-based NB IoT solution can be standardized and developed in a shorter time frame. A leading candidate for NB IoT, is a LTE based on a solution referred to as NB-LTE. LTE uplink however is based on single-carrier frequency-division multiple-access (SC-FDMA) modulation for the uplink data and control channels, and Zadoff-Chu sequences for random access.

Zadoff-Chu sequences have constant envelope. However, pulse shaping is needed to band limit their noise-like flat power spectral density before transmission. But the canonical LTE way of pulse shaping greatly destroys the constant envelope property of Zadoff-Chu sequence and the PAPRs of the resulting waveforms are relatively high.

SUMMARY

One or more embodiments herein include a method implemented by a wireless communication network node for transmitting a constant amplitude sequence. The method comprises extending the constant amplitude sequence by adding to the sequence one or more complex-valued elements that have the same amplitude as other complex-valued elements in the sequence. The method also includes upsampling the extended sequence by linearly interpolating a difference in phase between adjacent complex-valued elements in the extended sequence. The method further entails limiting a bandwidth of the upsampled sequence by low pass filtering the upsampled sequence. The method may also include transmitting the band limited sequence.

The wireless communication network node may be a radio network device, such as a M2M, MTC, NB-IoT, or NB-LTE device, or user equipment (UE), such as a cellphone or smartphone. The radio network device may transmit the band limited sequence in the uplink, e.g., as a random access preamble, or an uplink measurement signal for handover assessment. Alternatively, the wireless communication network node may be a network node, such as a base station (known in LTE as a NodeB, NB, or enhanced NodeB, eNB). The base station may broadcast the band limited sequence in the downlink, e.g., as a primary or secondary synchronization signal (PSS, SSS). In some embodiments, the wireless communication network node may be a network node without a radio transmitter, which performs the data processing steps of the method, and sends a band limited constant amplitude sequence to a base station for transmission to radio network devices.

In some embodiments, extension involves cyclically extending the constant amplitude sequence, by adding one or more complex-valued elements at the beginning of the sequence to the end of the sequence or by adding one or more complex-valued elements at the end of the sequence to the beginning of the sequence.

In some embodiments, interpolation entails, for each pair of adjacent complex-valued elements in the extended sequence: reducing an absolute difference in phase between those adjacent complex-valued elements by modulo $\pi$ in order to obtain a residual phase difference; and linearly interpolating the residual phase difference.

Alternatively, interpolation entails, for each pair of adjacent complex-valued elements in the extended sequence: reducing an absolute difference in phase between those adjacent complex-valued elements by modulo $2\pi$ in order to obtain a residual phase difference; and linearly interpolating the residual phase difference.

In some embodiments, interpolation is iteratively performed for multiple iterations as needed for a length of the upsampled sequence to reach a target length, wherein the target length corresponds to a sampling rate with which the upsampled sequence is to be sampled at baseband.

In one or more embodiments, extending comprises extending the constant amplitude sequence by the smallest amount needed for the extended sequence to have a length that is an integer factor of a target length of the upsampled sequence, wherein the target length of the upsampled sequence corresponds to a sampling rate with which the upsampled sequence is to be sampled at baseband.

In some embodiments, the method further comprises selecting the constant amplitude sequence from among a family of constant amplitude sequences that are ordered according to a root index of those sequences, by preferentially selecting a constant amplitude sequence within a subset of the sequences in the family that have a root index above a defined upper threshold or below a defined lower threshold.

Alternatively or additionally, the method further comprises selecting the constant amplitude sequence from among a family of constant amplitude sequences based on a current demand for transmission of the constant amplitude sequence to have a low peak-to-average power ratio, wherein transmissions of different sequences in the family have different peak-to-average power ratios.

Alternatively or additionally, the method further comprises selecting the constant amplitude sequence from among a family of constant amplitude sequences based on a current quality of radio coverage at the wireless communication network node, by preferentially selecting a constant amplitude sequence within a first subset of the sequences when the current quality of radio coverage is defined as poor and selecting a constant amplitude sequence within a different subset of the sequences when the current quality of radio coverage is defined as good.

In some embodiments, the constant amplitude sequence has a length of 251 complex-valued elements, wherein said extending comprises extending the sequence to a length of 254 complex-valued elements, and wherein said upsampling comprises upsampling the extended sequence by a factor of 4.

In some embodiments, transmitting comprises transmitting the band limited sequence over a plurality of subcarriers with a 312.5 Hz subcarrier spacing.

In some embodiments, the method further comprises sampling the upsampled sequence at baseband with a sampling rate that is an integer multiple of a bandwidth of the constant amplitude sequence.

In some embodiments, the method further comprises sampling the upsampled sequence at baseband with a sampling rate of approximately 320 kHz.

In some embodiments, the constant amplitude sequence is a Zadoff-Chu sequence.

In some embodiments, the constant amplitude sequence is a random access preamble sequence.

In some embodiments, transmitting comprises transmitting the band limited sequence as a long term evolution (LTE) transmission.

In some embodiments, transmitting comprises transmitting the band limited sequence as a narrowband internet of things (NB-IoT) transmission.

Embodiments also include a wireless communication network node comprising processing circuitry. The processing circuitry is characterized as being operative to extend a constant amplitude sequence by adding to the sequence one or more complex-valued elements that have the same amplitude as other complex-valued elements in the sequence. The processing circuitry is further characterized as being operative to upsample the extended sequence by linearly interpolating a difference in phase between adjacent complex-valued elements in the extended sequence. The processing circuitry is further characterized as being operative to limit a bandwidth of the upsampled sequence by low pass filtering the upsampled sequence. The processing circuitry may also be characterized as being operative to transmit the band limited sequence.

Embodiments also include a wireless communication network node for transmitting a constant amplitude sequence. The node in this regard is characterized by being configured to extend a constant amplitude sequence by adding to the sequence one or more complex-valued elements that have the same amplitude as other complex-valued elements in the sequence. The node is further characterized by being configured to upsample the extended sequence by linearly interpolating a difference in phase between adjacent complex-valued elements in the extended sequence. The node is further characterized by being configured to limit a bandwidth of the upsampled sequence by low pass filtering the upsampled sequence. The node may also be characterized by being configured to transmit the band limited sequence.

Embodiments further include an apparatus operative to generate a constant amplitude sequence. The apparatus includes a first module operative to extend the constant amplitude sequence by adding to the sequence one or more complex-valued elements that have the same amplitude as other complex-valued elements in the sequence. The also apparatus includes a second module operative to upsample the extended sequence by linearly interpolating a difference in phase between adjacent complex-valued elements in the extended sequence. The apparatus further includes a third module operative to limit a bandwidth of the upsampled sequence by low pass filtering the upsampled sequence. In some embodiments, the apparatus may include a fourth module operative to transmit the band limited sequence.

Embodiments also include a corresponding computer program and carrier containing the program.

BRIEF DESCRIPTION OF THE DRAWINGS

FIGS. 9 and 10 are block diagrams of Mod Pi constant amplitude sequence processing for various exemplary system parameters.

DETAILED DESCRIPTION

Figure 1:
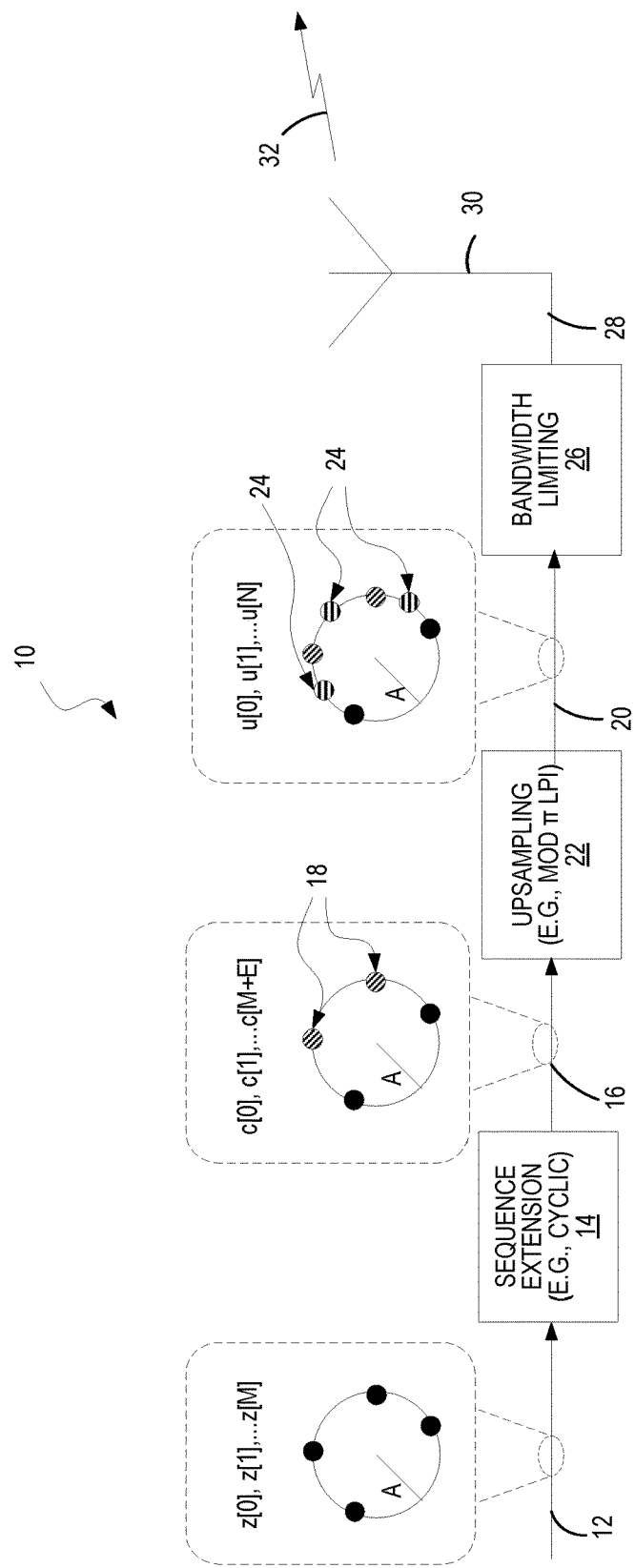
FIG. 1 is a block diagram depicting processing steps within a wireless communication network node.

FIG. 1 illustrates a wireless communication network node 10 such as a radio network device or a network node according to one or more embodiments. The node 10 is configured to transmit a constant amplitude sequence 12. In some embodiments, for example, this sequence 12 is a Zadoff-Chu sequence or other generalized chirp-like sequence.

The sequence 12 has multiple complex-valued elements (also referred to as samples or symbols). FIG. 1 shows the sequence 12 as being a sequence z with M elements (e.g., M=251). The M elements in the sequence 12 have the same amplitude A. The elements therefore each lie on the circumference of the same circle in the complex plane, such as the unit circle with A=1.

To condition this sequence 12 for transmitting, the wireless communication network node 10 extends the constant amplitude sequence 12 (Block 14) to obtain an extended sequence 16. The node 10 extends the sequence 12 by adding to the sequence 12 one or more complex-valued elements that have the same amplitude as the other complex-valued elements in the sequence 12. FIG. 1 shows the extended sequence 16 as being a sequence c with M+E elements, where E is the number of elements added to the sequence z (e.g., E=5). FIG. 1 shows two exemplary complex-valued elements 18 as added to the sequence.

In some embodiments, for example, the node 10 cyclically extends the sequence 12. That is, the node either adds one or more complex-valued elements at the beginning of the sequence 12 to the end of the sequence 12, or adds one or more complex-valued elements at the end of the sequence 12 to the beginning of the sequence 12.

The wireless communication network node 10 next upsamples the extended sequence 16 to obtain an upsampled sequence 20 (Block 22). The node 10 does so by linearly interpolating a difference in phase between adjacent complex-valued elements in the extended sequence 16. In doing so, the node 10 effectively inserts one or more intermediate complex-valued elements 24 between each pair of adjacent complex-valued elements in the extended sequence 16. In one or more embodiments as shown in FIG. 1, these intermediate elements 24 have (substantially) the same amplitude A as the other complex-valued elements in the extended sequence 16. The number of intermediate elements 24 inserted between each pair of adjacent elements is governed by the upsampling factor. FIG. 1 shows the upsampled sequence 20 as being a sequence u with N elements, where N=M+E+U, with U being the number of intermediate complex-valued elements 24 inserted into the sequence 20. In one example, N=1024.

Figure 2:
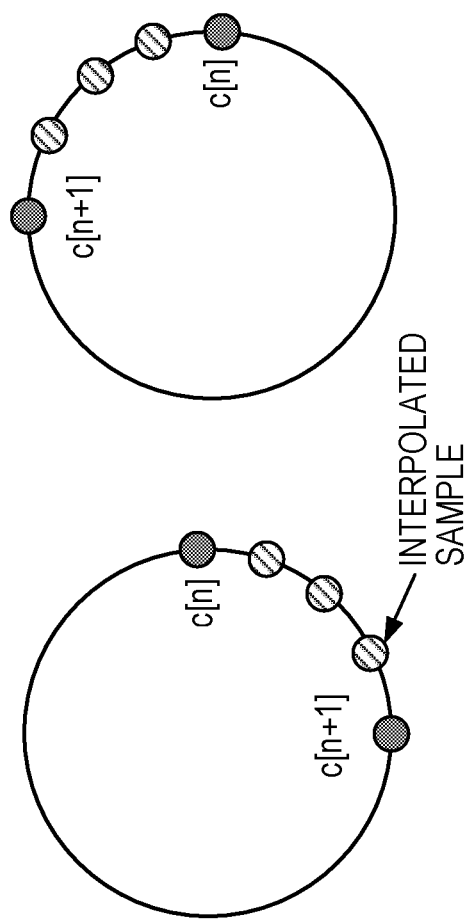
FIG. 2 depicts two ways of interpolating sequence elements between existing elements.

In some embodiments, the wireless communication network node 10 upsamples the extended sequence 16 using linear phase interpolation with a modulo operation performed on the phase difference between adjacent sequence elements. In one or more of these embodiments, the node 10, for each pair of adjacent complex-valued elements in the extended sequence 16, reduces an absolute difference in phase between those adjacent complex-valued elements by modulo Pi ($\pi$) in order to obtain a residual phase difference. The node 10 then linearly interpolates this residual phase difference. FIG. 2 illustrates this approach according to one or more embodiments.

Alternatively, the absolute difference in phase between adjacent complex-valued elements may be reduced by modulo 2*Pi ($2\pi$).

Regardless of the form of interpolation, though, the wireless communication network node 10 next limits a bandwidth of the upsampled sequence, e.g., to a defined sequence bandwidth (e.g., 80 kHz) (Block 26). The node 10 does so by low pass filtering the upsampled sequence. The node 10 then transmits the band limited sequence 28, e.g., as transmission 32. The node 10 may do so after any additional baseband and/or radio frequency conditioning or processing, such as repetition and/or cyclic prefix insertion. The node 10 may transmit the sequence 28 via one or more associated antennas 30. In some embodiments, the node 10 may only generate the extended sequence 28, and transfer the sequence 28 to different wireless communication network node for transmission.

Notably, in some embodiments, transmitting the constant amplitude sequence 12 as shown in FIG. 1 preserves the constant amplitude nature of the sequence 12 and band limits the sequence, while also yielding a transmission 32 the spectrum of which has a relatively fast rate of decay.

In some embodiments, the wireless communication network node 10 minimizes the extent to which it extends the sequence 12, e.g., to achieve a defined objective. For example, in one embodiment, the node 10 extends the constant amplitude sequence 12 by the smallest amount needed (e.g., 5 elements) for the extended sequence 16 to have a length (e.g., 256) that is an integer factor of a target length (e.g., 1024) of the upsampled sequence 20. Thus the target length may for instance correspond to a sampling rate (e.g., 320 kHz) with which the upsampled sequence 20 is to be sampled, e.g., at baseband. In one embodiment, for example, minimizing sequence extension in this way advantageously yields good time resolution for the transmitted sequence, e.g., by keeping the sequence's elements as close to each other as possible.

In one or more embodiments, the wireless communication network node 10 performs linear interpolation as described above iteratively for multiple iterations. The node 10 does this as needed for a length of the upsampled sequence 20 to reach a target length (e.g., 1024). This target length corresponds to a sampling rate (e.g., 320 kHz) with which the upsampled sequence is to be sampled, e.g., at baseband.

In some embodiments, the constant amplitude sequence 12 is a Zadoff-Chu (ZC) sequence. Such may be the case for instance where the wireless communication network node 10 is a radio network device, and the sequence is a random access preamble sequence, e.g., a sequence used on the physical random access channel (PRACH) in a system that is or evolves from Long Term Evolution (LTE). One such system may be for instance a narrowband internet of things (NB-IoT) system. Additionally or alternatively, the ZC sequence may be used by a radio network device for an uplink measurement signal, by which a plurality of network nodes may measure the signal strength and timing of the signal, for use in handover assessment and implementation. In other embodiments, where the wireless communication network node 10 is a network node such as a base station, the sequence may be a primary or secondary synchronization signal that is broadcast in a cell. One or more such embodiments will now be described in more detail.

In the existing LTE random access design, random access serves multiple purposes such as initial access when establishing a radio link, scheduling request, etc. Among others, a main objective of random access is to achieve uplink synchronization, which is important for maintaining the uplink orthogonality in LTE. To preserve orthogonality among different radio network devices in an OFDM or SC-FDMA system, the time of arrival of each device signal needs to be within the cyclic prefix (CP) of the OFDM or SC-FDMA signal.

Figure 3:
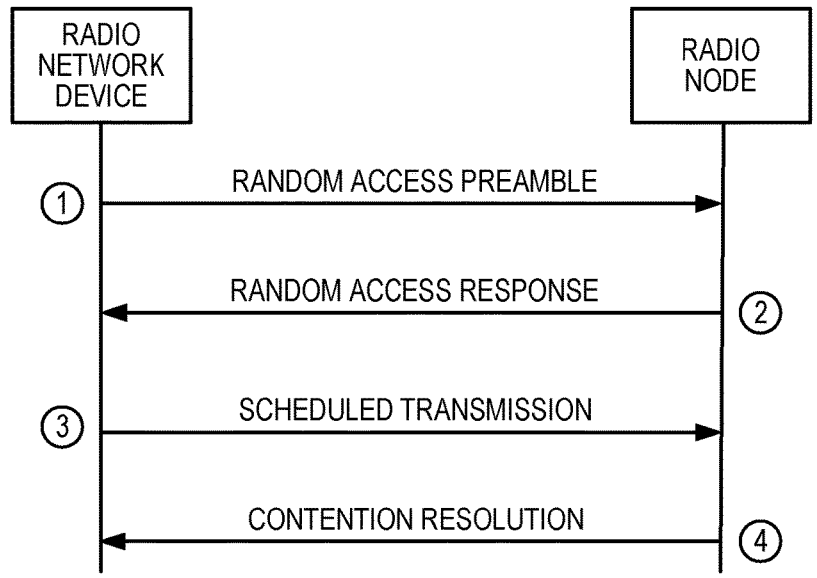
FIG. 3 is a signaling diagram depicting a Random Access procedure.

LTE random access can be either contention-based or contention-free. The contention-based random access procedure consists of four steps, as illustrated in FIG. 3. Note that only the first step involves physical-layer processing specifically designed for random access, while the remaining three steps follow the same physical-layer processing used in uplink and downlink data transmission. For contention-free random access, the radio network device uses reserved preambles assigned by the base station. In this case, contention resolution is not needed, and thus only Steps 1 and 2 are required.

Figure 4:
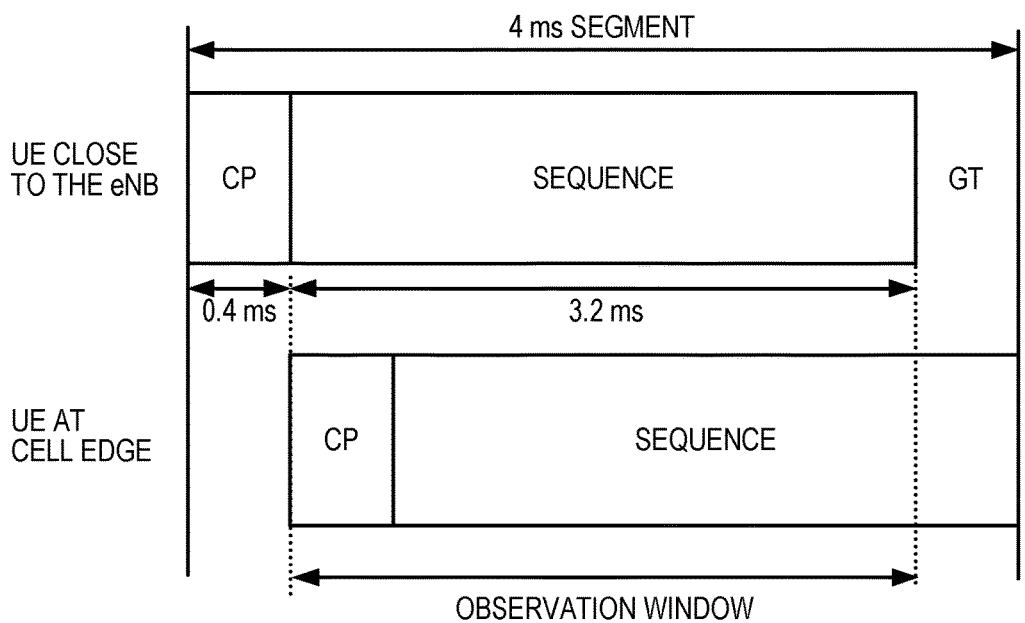
FIG. 4 is a timing diagram depicting Random Access preamble timing for different radio network devices.

As shown in FIG. 3, in the first step, a PRACH preamble sequence is sent by the radio network device during a random access time segment illustrated in FIG. 4. The PRACH preamble sequence does not occupy the entire random access segment, leaving some time as guard time and also allow a cyclic prefix (CP) interval. As discussed earlier, to maximize PA efficiency and coverage, it is desirable to have PRACH preambles as close to constant-envelope as possible. In the below description, PRACH signal and PRACH preamble may be used interchangeably.

For concreteness, assume 312.5 Hz PRACH subcarrier spacing and length 251 ZC sequences as an example. The corresponding symbol rate is 78.4375 kHz (=0.3125×251). As a baseline, assume 80 kHz PRACH bandwidth and 320 kHz sampling rate for illustration. (If desired, lower baseband sampling rate can be used since the symbol rate is less than 80 kHz).

Figure 5:
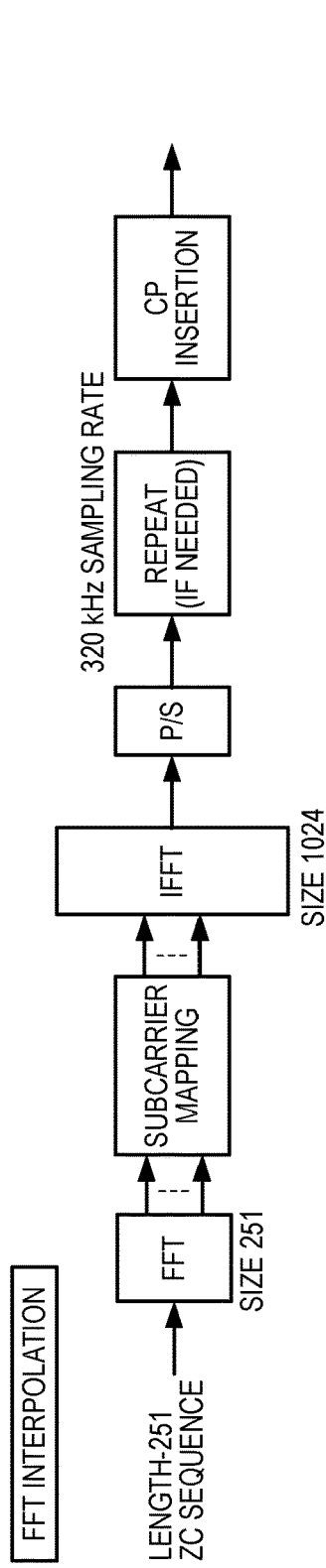
FIG. 5 is a block diagram of an LTE transmitter structure.

For comparison, the commonly used LTE transmitter structure is shown in FIG. 5. The disadvantage of this approach (referred to as FFT interpolation) is that the PAPRs of the resulting preambles may be large. For example, with this approach the length 251 ZC sequences are sampled at the rate of 320 kHz. The resulting interpolated constellation is illustrated in FIG. 7A. Notice that the constant envelope property of ZC sequences is destroyed after the FFT/IFFT interpolation. Further, the corresponding PAPR values are plotted in FIG. 8. The PAPRs range from 2.6 to 6.9 dB, depending on the root index of the sequence.

Figure 6:
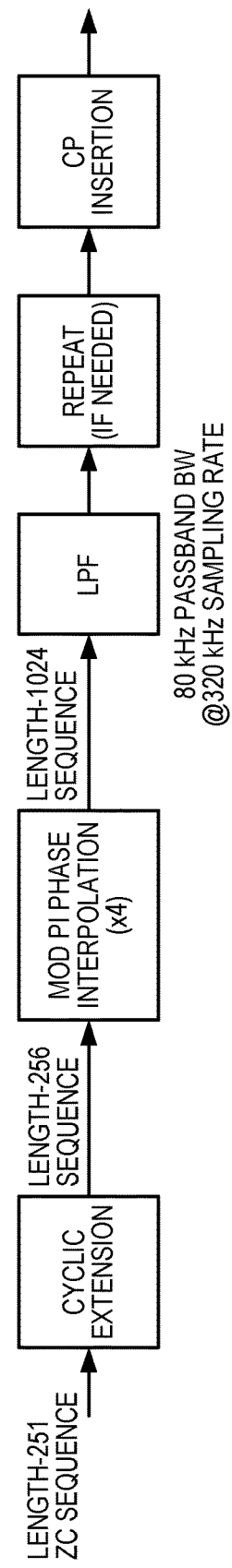
FIG. 6 is a block diagram of Mod Pi constant amplitude sequence processing.

FIG. 6 by contrast illustrates one approach for transmitting the ZC sequence according to some embodiments herein, e.g., using the above assumptions for a concrete example. Denote by $z_i=(z_i[0], \ldots, z_i[250])$ the length 251 ZC sequence with root i (and certain cyclic shift if needed). The random access transmitter architecture generates the preamble as follows.

First, the wireless communication network node 10 performs cyclic extension. Specifically, the node cyclically extends $z_i=(z_i[0], \ldots, z_i[250])$ to the length 256 sequence, denoted as $c_i$, i.e., $c_i=(z_i[0], \ldots, z_i[250], z_i[0], \ldots, z_i[4])$. Note that all the elements lie on the unit circle in the complex plane. This step will facilitate upsampling in the next step.

Second, the wireless communication network node 10 performs Mod Pi phase interpolation. Specifically, the node 10 upsamples $c_i$ by 4 times. The upsampling is achieved by linearly interpolating the phases (modulo Pi) of every two adjacent symbols of $c_i$. This results in a length 1024 sequence denoted as $x_i$. The modulo-Pi phase operation is again illustrated in FIG. 2.

Third, the wireless communication network node 10 performs low pass filtering. A linear low pass filter with 80 kHz passband bandwidth is applied to limit the bandwidth of the preamble to 80 kHz.

Fourth, the wireless communication network node 10 performs repetition and CP insertion. If coverage extension is needed, repetition can be applied for the PRACH preamble. The number of inserted CP is 128 samples for the 400 us CP at 320 kHz sampling rate.

Figure 7B:
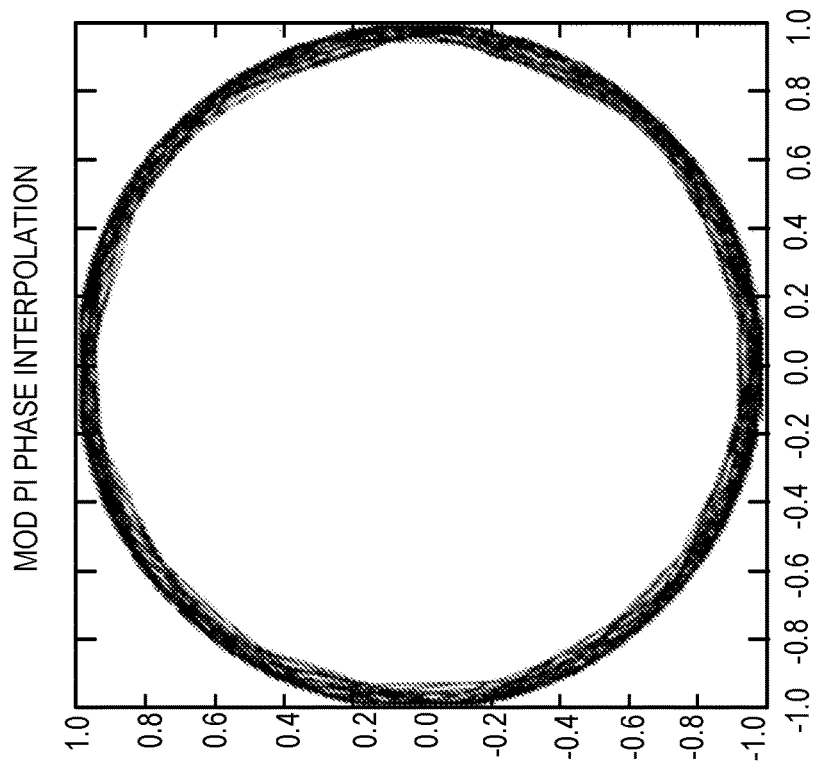
FIGS. 7A and 7B are plots of the interpolated constellation for FFT interpolation and Mod Pi phase interpolation, respectively.
Figure 7A:
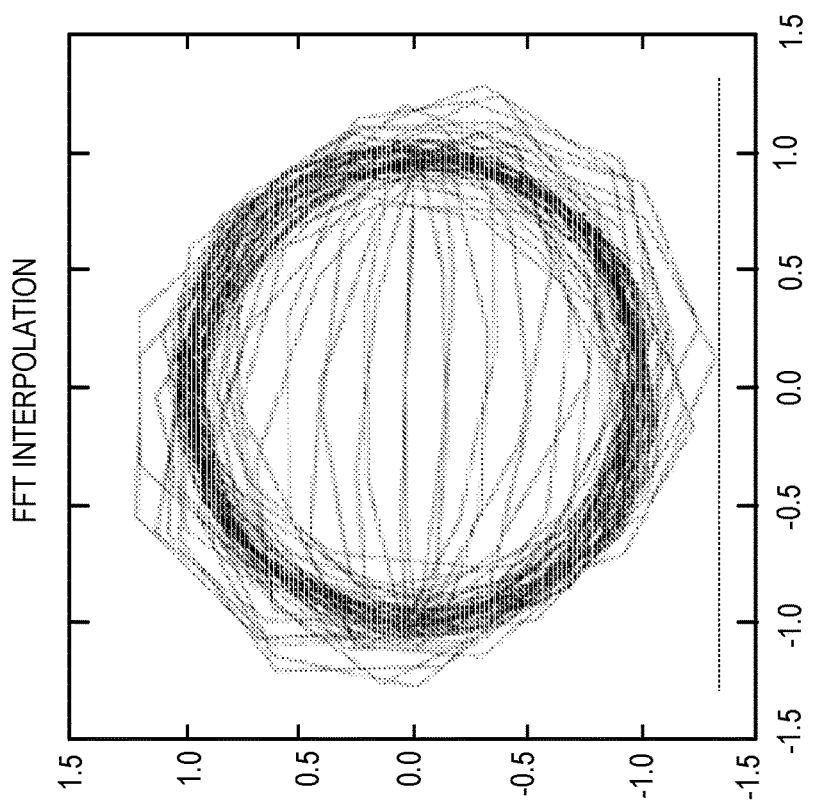
Figure 8:
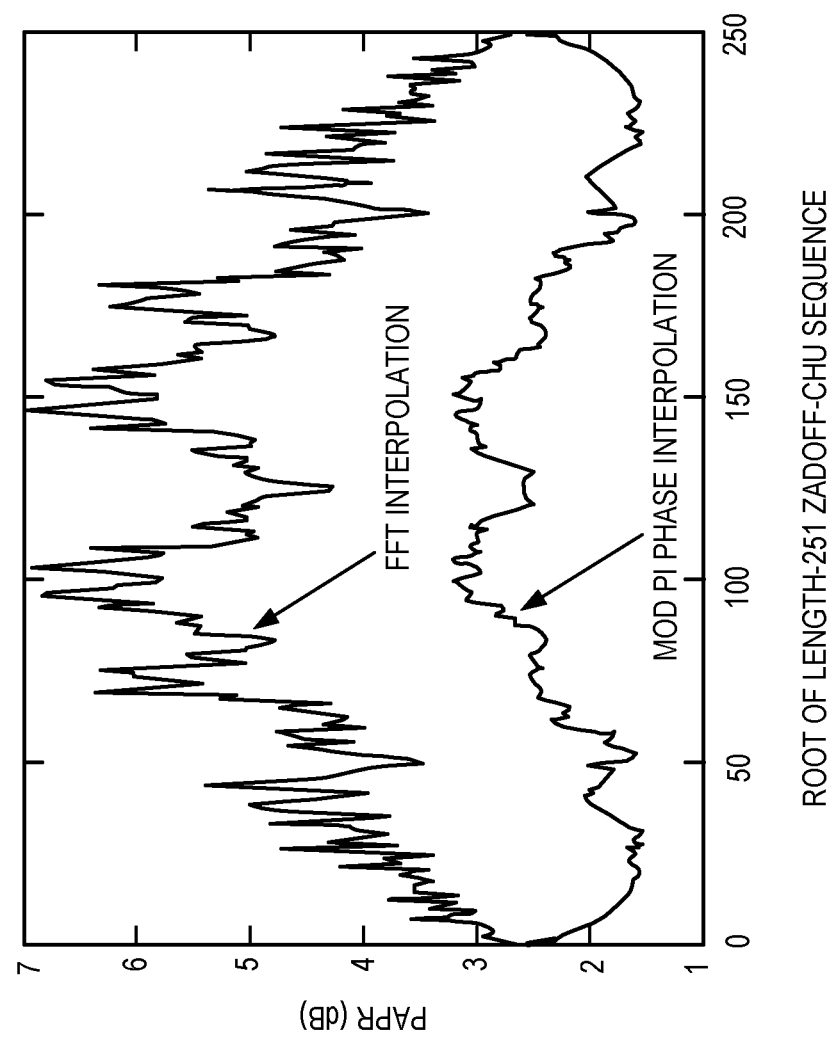
FIG. 8 is a graph of PAPR vs. Z-C sequence root for FFT interpolation and Mod Pi phase interpolation.

The resulting interpolated constellation is illustrated in FIG. 7B, and the corresponding PAPR values are shown in FIG. 8. Notice that the PAPRs are dramatically reduced, ranging from 1.6 dB to 3.2 dB. Further, relatively many sequences with less than 2 dB PAPR are available for PRACH preamble selection. (The set becomes much larger if the cyclic shift versions of the base ZC sequences are taken into account.)

In at least some embodiments, compared to the FFT interpolation, the auto/cross correlation properties of the preambles become slightly worse with modulo Pi phase interpolation. However, they are satisfactory enough to achieve high detection rate, low false alarm rate, and accurate timing estimation for random access.

FIGS. 9 and 10 illustrate still other exemplary embodiments herein, with different assumptions for the variables discussed above. FIGS. 9 and 10 both assume a subcarrier spacing of 1.25 kHz, e.g., as used in LTE.

Generally, some embodiments include a new random access transmitter architecture designed for generating Zadoff-Chu sequence based preambles in NB-IoT. The new transmitter architecture can reduce the PAPR range to 1.6~3.2 dB (vs. 2.6~6.9 dB PAPR achieved by the canonical LTE random access transmitter architecture). With a further careful preamble selection, the PAPR can be reduced to 1.7 dB. The new design greatly reduces the extent of PA backoff and improves PA efficiency. Thus, it helps improve the PRACH coverage and battery efficiency.

Since the new transmitter architecture can greatly reduce the PAPR of PRACH signals, it reduces the extent of PA backoff and improves PA efficiency. Thus, it helps improve the PRACH coverage and battery efficiency. Further, the transmitter architecture is simple and easy to implement. This reduces both development cost and time-to-market.

Generally, embodiments herein may involve the following.

- Cyclically extend the base sequence to facilitate upsampling, filtering, and other baseband processing at the desired sampling rate.
- Use linear phase interpolation with modulo Pi (or in some cases 2π) operation to upsample the base sequence to the desired sequence length.
- Apply a low pass filter to the linearly phase interpolated sequence to band limit the signal.
- Following conventional RF back end processing, the band limited sequence may then be transmitted.

Regardless of the particular context of application, the wireless communication network node 10 in some embodiments selects the constant amplitude sequence 12 to achieve a particular objective, e.g., low PAPR, which may depend on the node's current channel conditions or wireless environment. For example, in some embodiments, the node 10 selects the constant amplitude sequence from among a family of constant amplitude sequences based on a current demand for transmission of the constant amplitude sequence to have a low peak-to-average power ratio (PAPR). In this case, transmissions of different sequences in the family may have different peak-to-average power ratios.

Such demand in some embodiments may depend on the wireless communication network node's current quality of coverage. For example, in some embodiments, the node 10 preferentially selects a constant amplitude sequence within a first subset of the sequences when the current quality of radio coverage is defined as poor and selects a constant amplitude sequence within a different subset of the sequences when the current quality of radio coverage is defined as good. The first and second subsets in some embodiments are defined as a function of a root index by which sequences in the family are ordered. In some embodiments, for instance, the first subset includes those sequences with a root index above a defined upper threshold and those sequences with a root index below a defined lower threshold. As seen in FIG. 8, for example, the first subset may include those sequences whose PAPR falls below 2 dB, with those sequences having for instance a root index below approximately 45 or a root index above approximately 210. In such a case, the wireless communication network node 10 would attempt to select a sequence in the first subset before resorting to selecting a sequence in the second subset.

Figure 11:
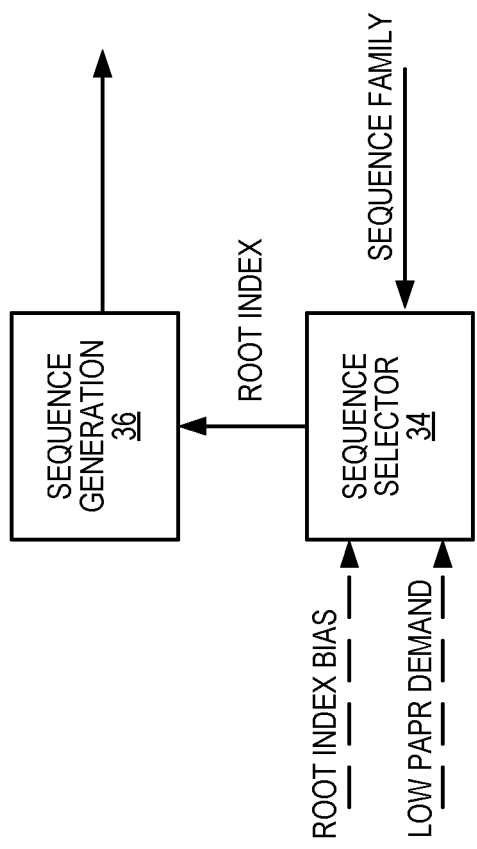
FIG. 11 is a block diagram of constant amplitude sequence generation.

FIG. 11 illustrates sequence selection and generation performed by the wireless communication network node 10 according to some of these embodiments. As shown, sequence selector 34 receives information (e.g., root indexes) regarding the sequence family. The selector 34 selects a sequence from among the family by selecting one of the root indexes, and provides the selected sequence index to sequence generation 36. Sequence generation 36 generates the sequence 12 based on that selection. Where the selected sequence is a base sequence, such generation may involve for instance cyclically shifting that base sequence.

Regardless, the sequence selector 34 may select the sequence based on a root index bias. This bias biases the selection towards certain root indexes, e.g., those included in the first subset. Alternatively or additionally, the selector 34 may select the sequence based on current PAPR demands as described above.

In at least some embodiments, the wireless communication network node 10 operates according to narrowband Internet of Things (NB-IoT) specifications. In this regard, embodiments described herein are explained in the context of operating in or in association with a RAN that communicates over radio communication channels with radio network devices, also interchangeably referred to as wireless terminals or UEs, using a particular radio access technology. More specifically, embodiments are described in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

The wireless communication network node 10 shown in FIG. 1, as described herein, can be any type of node capable of communicating with another node in a wireless communication network. In the context of the present disclosure, it should be understood that a wireless communication network node may be a radio network device communicating with the network over a wireless link, or a network node communicating with at least some other network nodes via a wired or wireless backhaul connection. A network node may additionally communication with radio network devices via a wireless link, such as a base station; alternatively, a network node may be a core network node which communicates with other nodes via a wired connection. A radio network device may refer to a machine-to-machine (M2M) device, a machine-type communications (MTC) device, and/or a NB-IoT device. The radio network device may also be a UE, however it should be noted that the UE does not necessarily have a "user" in the sense of an individual person owning and/or operating the device. A radio network device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), and the like. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IoT scenario, a radio network device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a radio network device as described herein may be comprised in a vehicle and may perform monitoring and/or reporting of the vehicle's operational status or other functions associated with the vehicle.

Figure 12:
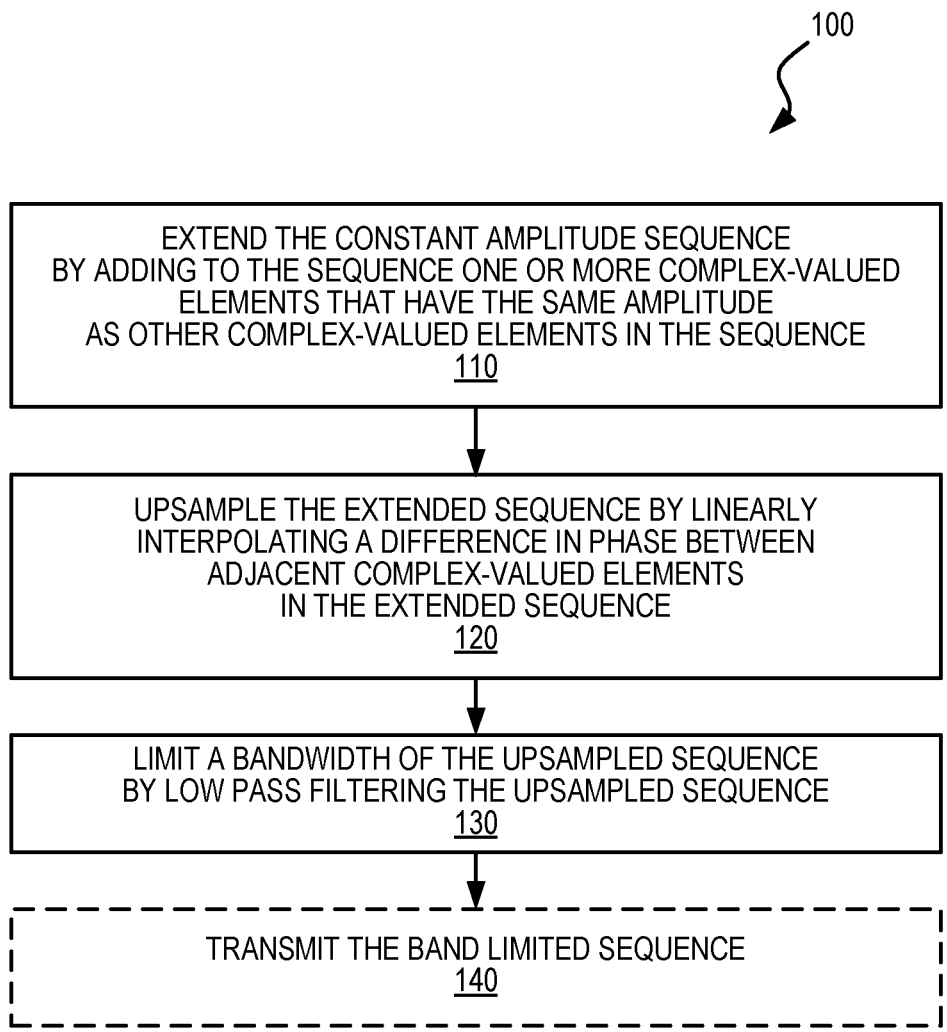
FIG. 12 is a flow diagram of a method of preparing a constant amplitude sequence for transmission.

In view of the above modifications and variations, those skilled in the art will appreciate that the wireless communication network node 10 illustrated in FIG. 1 may be configured to perform the method 100 illustrated in FIG. 12 for transmitting a constant amplitude sequence. As shown, the method 100 includes extending the constant amplitude sequence by adding to the sequence one or more complex-valued elements that have the same amplitude as other complex-valued elements in the sequence (Block 110). The method further includes upsampling the extended sequence by linearly interpolating a difference in phase between adjacent complex-valued elements in the extended sequence (Block 120). The method also entails limiting a bandwidth of the upsampled sequence by low pass filtering the upsampled sequence (Block 130). The method may additionally involve transmitting the band limited sequence (Block 140), in embodiments where the wireless communication network node 10 is a base station or a radio network device, such as a UE or IoT device.

Note that the wireless communication network node 10 as described above may perform the processing herein by implementing any functional means or units. In one embodiment, for example, the node 10 comprises processing circuitry configured to perform the steps shown in FIG. 12. The processing circuitry in this regard may comprise circuits dedicated to performing certain functional processing, also known as "dedicated hardware" circuits; one or more programmable logic circuits with appropriate firmware; one or more appropriately programmed microprocessors in conjunction with memory; or any combination thereof. In embodiments that employ memory, which may comprise one or several types of memory such as read-only memory (ROM), random-access memory, cache memory, flash memory devices, optical storage devices, etc., the memory stores program code that, when executed by processing circuitry, performs the method 100 described herein.

Figure 13:
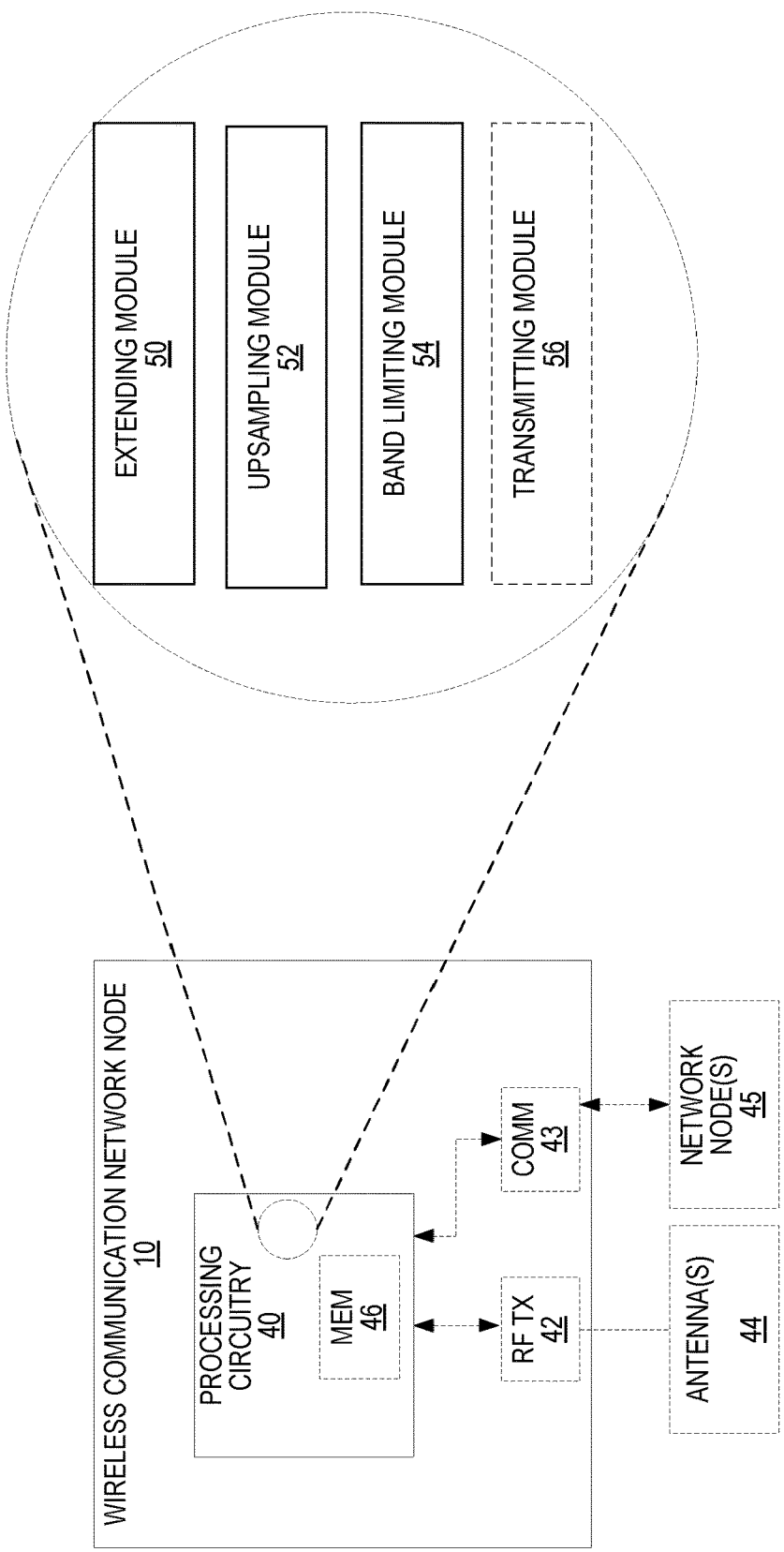
FIG. 13 is a block diagram of a wireless communication network node, depicting processing circuitry comprising functional units or processing modules.

FIG. 13 illustrates additional details of a wireless communication network node 10 in accordance with one or more embodiments. As shown, the node 10 includes processing circuitry 40 (which may comprise one or more microprocessors). In various embodiments, the node 10 may also include a radio frequency transmitter 42 and/or communication circuitry 43. The radio frequency transmitter 42 is configured to transmit via one or more antennas 44. The communication circuitry 43 is configured to exchange data with one or more other network nodes 45. In particular, in one embodiment the node 10 comprises a network node operative to perform the extending, upsampling, and band limiting functions described herein, and send the resulting band limited constant amplitude sequence 28 to another network node, such as a base station, for radio transmission to a plurality of radio network devices. In other embodiments, the wireless communication network node 10 is itself a base station, including an RF transmitter 42 and antenna(s) 44 operative to transmit the band limited sequence, e.g., as a synchronization signal. In still other embodiments, the wireless communication network node 10 is a radio network device, such as a UE or MTC/IoT type device, as described herein, which also includes a RF TX 42 and antenna(s) 44.

In all such embodiments, the processing circuitry 40 is configured to perform processing described above, e.g., the method 100 depicted in FIG. 12, such as by executing instructions stored in memory 46. The processing circuitry 40 in this regard may implement certain functional means, units, or modules. Specifically, referring to FIG. 13, the processing circuitry 40 may implement an extending module 50 operative to extend the sequence 12, an upsampling module 52 operative to upsample the extended sequence 16, and a band limiting module 54 operative to limit the bandwidth of the upsampled sequence 20. In some embodiments, a transmitting module 56 is operative to transmit the band limited sequence 28, e.g., via RF TX 42 and antenna(s) 44.

Those skilled in the art will also appreciate that embodiments herein further include corresponding computer programs. A computer program comprises instructions which, when executed on at least processing circuitry 40 of a wireless communication network node 10, cause the node 10 to carry out any of the respective processing described above, such as the method 100. A computer program in this regard may comprise one or more code modules corresponding to the means, units, or modules 50-56 described above.

Embodiments further include a carrier containing such a computer program. This carrier may comprise one of an electronic signal, optical signal, radio signal, or computer readable storage medium 46.

Embodiments of the present invention present numerous advantages over the prior art. By appropriately selecting a constant amplitude sequence, and processing the sequence according to Mod Pi interpolation as described and claimed herein, the transmitted sequence exhibits a low peak to average power ratio (PAPR), as compared to prior art processes. The low PAPR enables a low power amplifier PA backoff. This increases the efficiency of the PA (particularly when integrated in a SoC solution), hence lowering power consumption and extending battery life. Accordingly, embodiments disclosed herein may be particularly well suited for IoT type applications. Furthermore, in embodiments that conform to existing LTE definitions and protocols, further advantages include reduced development cost and time to market, e.g., for NB-LTE, NB-IoT, and similar radio network devices.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a node operative in a wireless communication network for generating a constant amplitude sequence suitable for transmission, the method characterized by:
   extending the constant amplitude sequence by adding to the sequence one or more complex-valued elements that have the same amplitude as other complex-valued elements in the sequence;
   upsampling the extended sequence by linearly interpolating a difference in phase between adjacent complex-valued elements in the extended sequence; and
   limiting a bandwidth of the upsampled sequence by low pass filtering the upsampled sequence;
   wherein extending the constant amplitude sequence comprises extending the constant amplitude sequence a smallest amount needed for the extended sequence to have a length that is an integer factor of a target length of the upsampled sequence, and
   wherein the target length of the upsampled sequence corresponds to a sampling rate with which the upsampled sequence is to be sampled at baseband.

2. The method of claim 1, wherein the node is a network node, and wherein the method is further characterized by sending the band limited sequence to a base station for transmission as a synchronization signal.

3. The method of claim 1, wherein the method is further characterized by transmitting the band limited sequence.

4. The method of claim 3, wherein the node is a radio network device, and wherein transmitting the band limited sequence comprises transmitting the band limited sequence to a base station.

5. The method of claim 3, wherein the node is a base station, and wherein transmitting the band limited sequence comprises broadcasting the band limited sequence as a synchronization signal.

6. The method of claim 1, wherein extending the constant amplitude sequence comprises cyclically extending the constant amplitude sequence by performing one of:
   adding one or more complex-valued elements at the beginning of the sequence to the end of the sequence; and
   adding one or more complex-valued elements at the end of the sequence to the beginning of the sequence.

7. The method of claim 1, wherein linearly interpolating a difference in phase comprises, for each pair of adjacent complex-valued elements in the extended sequence:
   reducing an absolute difference in phase between those adjacent complex-valued elements by modulo pi ($\pi$) in order to obtain a residual phase difference; and
   linearly interpolating the residual phase difference.

8. The method of claim 1, wherein linearly interpolating a difference in phase is iteratively performed for multiple iterations as needed for a length of the upsampled sequence to reach a target length, wherein the target length corresponds to a sampling rate with which the upsampled sequence is to be sampled at baseband.

9. The method of claim 1, wherein the method is further characterized by selecting the constant amplitude sequence from among a family of constant amplitude sequences that are ordered according to a root index of those sequences, by preferentially selecting a constant amplitude sequence within a subset of the sequences in the family that have a root index above a defined upper threshold or below a defined lower threshold.

10. The method of claim 1, wherein the method is further characterized by selecting the constant amplitude sequence from among a family of constant amplitude sequences based on a current demand for transmission of the constant amplitude sequence to have a low peak-to-average power ratio, wherein transmissions of different sequences in the family have different peak-to-average power ratios.

11. The method of claim 1, wherein the method is further characterized by selecting the constant amplitude sequence from among a family of constant amplitude sequences based on a current quality of radio coverage at the node, by preferentially selecting a constant amplitude sequence within a first subset of the sequences when the current quality of radio coverage is defined as poor and selecting a constant amplitude sequence within a different subset of the sequences when the current quality of radio coverage is defined as good.

12. The method of claim 1, wherein the constant amplitude sequence has a length of 251 complex-valued elements, wherein extending the constant amplitude sequence comprises extending the sequence to a length of 254 complex-valued elements, and wherein upsampling the extended sequence comprises upsampling the extended sequence by a factor of 4.

13. The method of claim 2, wherein transmitting the band limited sequence comprises transmitting the band limited sequence over a plurality of subcarriers with a 312.5 Hz subcarrier spacing.

14. The method of claim 1, wherein the method is further characterized by sampling the upsampled sequence at baseband with a sampling rate that is an integer multiple of a bandwidth of the constant amplitude sequence.

15. A wireless communication network node comprising processing circuitry, and characterized by the processing circuitry being operative to:
  extend a constant amplitude sequence by adding to the sequence one or more complex-valued elements that have the same amplitude as other complex-valued elements in the sequence;
  upsample the extended sequence by linearly interpolating a difference in phase between adjacent complex-valued elements in the extended sequence; and
  limit a bandwidth of the upsampled sequence by low pass filtering the upsampled sequence;
  wherein extending the constant amplitude sequence comprises extending the constant amplitude sequence by a smallest amount needed for the extended sequence to have a length that is an integer factor of a target length of the upsampled sequence, and
  wherein the target length of the upsampled sequence corresponds to a sampling rate with which the upsampled sequence is to be sampled at baseband.

16. The node of claim 15, further comprising communication circuitry operatively connected to the processing circuitry, wherein the wireless communication network node is a network node, and wherein the processing circuitry is further operative to cause the communication circuitry to transmit the band limited sequence to a base station for radio transmission to one or more radio network devices.

17. The node of claim 15, further comprising one or more antennas and a transmitter operatively connected to the processing circuitry, and characterized by the processing circuitry being further operative to cause the transmitter to transmit the band limited sequence.

18. An apparatus operative to generate a constant amplitude sequence, comprising:
  a first module operative to extend the constant amplitude sequence by adding to the sequence one or more complex-valued elements that have the same amplitude as other complex-valued elements in the sequence;
  a second module operative to upsample the extended sequence by linearly interpolating a difference in phase between adjacent complex-valued elements in the extended sequence; and
  a third module operative to limit a bandwidth of the upsampled sequence by low pass filtering the ups upsampled sequence;
  wherein the first module is operative to extend the constant amplitude sequence by a smallest amount needed for the extended sequence to have a length that is an integer factor of a target length of the upsampled sequence, and
  wherein the target length of the upsampled sequence corresponds to a sampling rate with which the upsampled sequence is to be sampled at baseband.

19. The apparatus of claim 18, further comprising:
  a fourth module operative to transmit the band limited sequence.

* * * * *